United States Patent
Prabhune et al.

(10) Patent No.: US 9,622,051 B2
(45) Date of Patent: Apr. 11, 2017

(54) IDENTIFIERS FOR ENTERPRISE MESSAGES

(71) Applicant: Verizon Patent and Licensing Inc., Arlington, VA (US)

(72) Inventors: Rohini Prabhune, Fremont, CA (US); Kumar Sanjeev, San Ramon, CA (US); Radhika Khanna, Danville, CA (US); Lodema M. Steinbach, Clayton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/834,917

(22) Filed: Aug. 25, 2015

(65) Prior Publication Data

US 2017/0006439 A1    Jan. 5, 2017

Related U.S. Application Data (60) Provisional application No. 62/187,489, filed on Jul. 1, 2015.

(51) Int. Cl.
*H04W 4/12* (2009.01)
*H04L 12/26* (2006.01)
*H04L 12/58* (2006.01)

(52) U.S. Cl.
CPC .............. *H04W 4/12* (2013.01); *H04L 43/16* (2013.01); *H04L 51/10* (2013.01)

(58) Field of Classification Search
CPC ........... H04W 4/12; H04L 43/16; H04L 51/10
USPC ......................................................... 455/466
See application file for complete search history.

(56) References Cited

U.S. PATENT DOCUMENTS

| | | | |
|---|---|---|---|
| 8,694,032 B1* | 4/2014 | Kilpatrick | H04W 4/12 370/312 |
| 2006/0281447 A1* | 12/2006 | Lewis | H04M 3/42042 455/418 |
| 2007/0073767 A1* | 3/2007 | Springer | G06F 17/30038 |
| 2007/0266090 A1* | 11/2007 | Len | G06F 17/211 709/204 |
| 2010/0042688 A1* | 2/2010 | Maghraby | G06Q 30/0228 709/206 |
| 2010/0192068 A1* | 7/2010 | Wineinger | G06F 17/30905 715/744 |
| 2013/0159431 A1* | 6/2013 | Berry | H04L 51/08 709/206 |
| 2015/0134448 A1* | 5/2015 | Tung | H04M 1/72552 705/14.53 |

FOREIGN PATENT DOCUMENTS

GB          1601212 A1 * 11/2005  ............. H04M 1/57

\* cited by examiner

*Primary Examiner* — Nathan Taylor (57) ABSTRACT

A device of a first party may receive a message from a second party. The device may obtain mapping information. The mapping information may be associated with a third party verification that the enterprise identifier was assigned to the second party. The mapping information may be associated with mapping the enterprise identifier to a media identifier selected by the second party or the third party to represent the enterprise sender. The device may map the enterprise identifier to the media identifier based on the mapping information. The device may provide the media identifier with the message.

20 Claims, 5 Drawing Sheets

IDENTIFIERS FOR ENTERPRISE MESSAGES

RELATED APPLICATION(S)

This application claims priority under 35 U.S.C. §119 to U.S. Provisional Patent Application No. 62/187,489, filed on Jul. 1, 2015, the content of which is incorporated by reference herein in its entirety.

BACKGROUND

An enterprise customer of a wireless service provider may utilize an enterprise server (e.g., a message server) to send a message to an individual customer of the wireless service provider. For example, a bank may send an account access verification message to a customer via a network of the wireless service provider. The enterprise customer may be provided with an enterprise identifier (e.g., a numeric code) with which to send and/or receive one or more messages.

DETAILED DESCRIPTION OF PREFERRED EMBODIMENTS

The following detailed description of example implementations refers to the accompanying drawings. The same reference numbers in different drawings may identify the same or similar elements.

An enterprise client, such as a company (e.g., a bank, a store, a website, etc.), an organization (e.g., a charity, a trade group, a government agency, etc.), or the like may provide messages to a large quantity of users. For example, a bank may utilize one or more messages, transmitted via short message service (SMS) messaging, multimedia message service (MMS) messaging, or the like, to provide account verification codes to one or more customers of the bank. A messaging application server associated with a wireless service provider may assign an enterprise identifier to the enterprise client (e.g., an alphanumeric code uniquely identifying the enterprise client) with which to send and receive one or more messages. For example, the bank may receive a six digit code that is displayed as a sender of a message from the bank. However, the user may have difficulty identifying the source of a message from the enterprise identifier, and may need to search the Internet to confirm that the sender of the message is genuine. Implementations, described herein, may map the enterprise identifier to a media identifier, such as an icon (e.g., a logo of an enterprise customer), an image, a video, a sound, or the like, thereby providing a user of a mobile device with verification of the sender of a message.

Figure 1A:
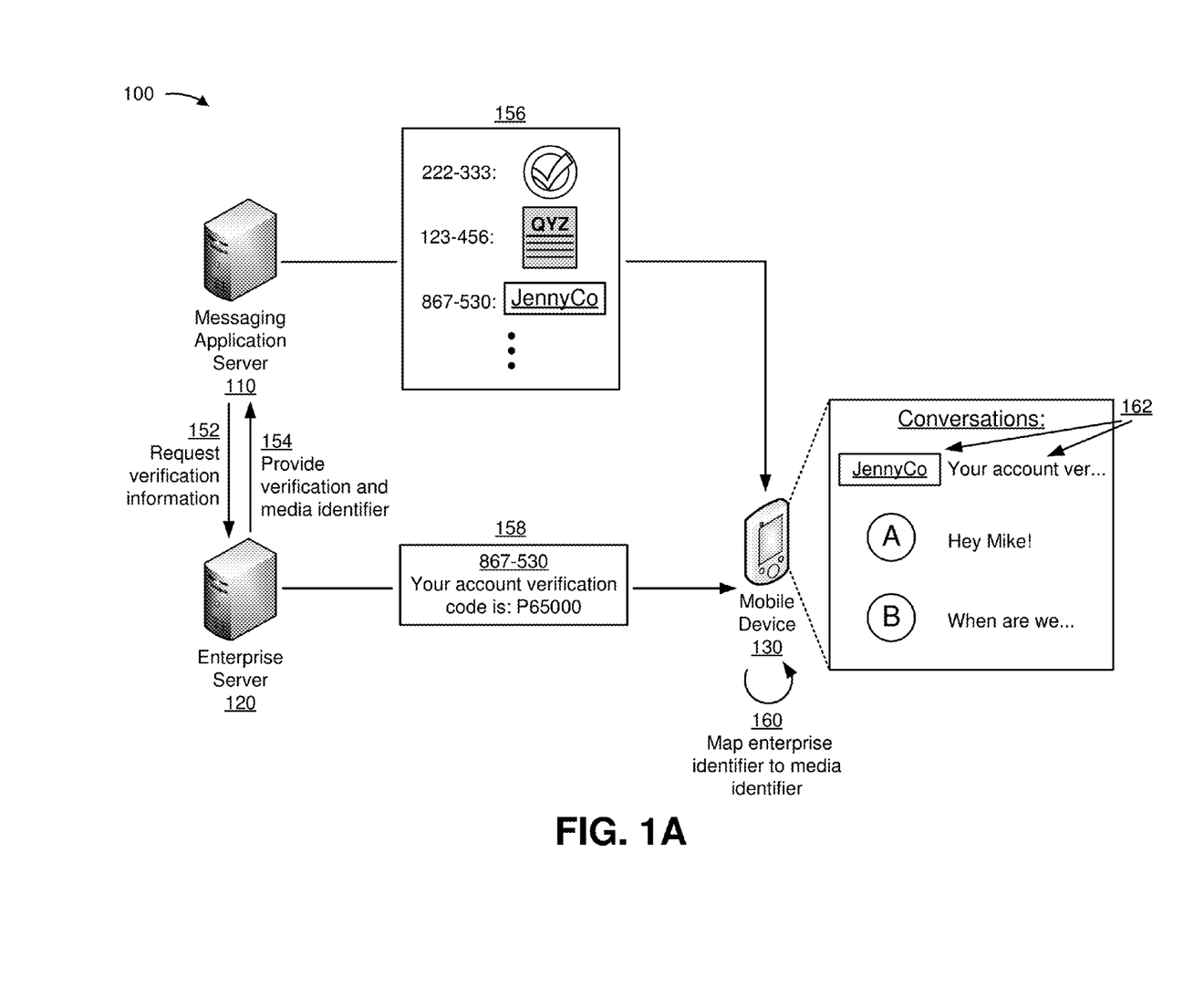
FIGS. 1A and 1B are diagrams of an overview of an example implementation described herein.
Figure 1B:
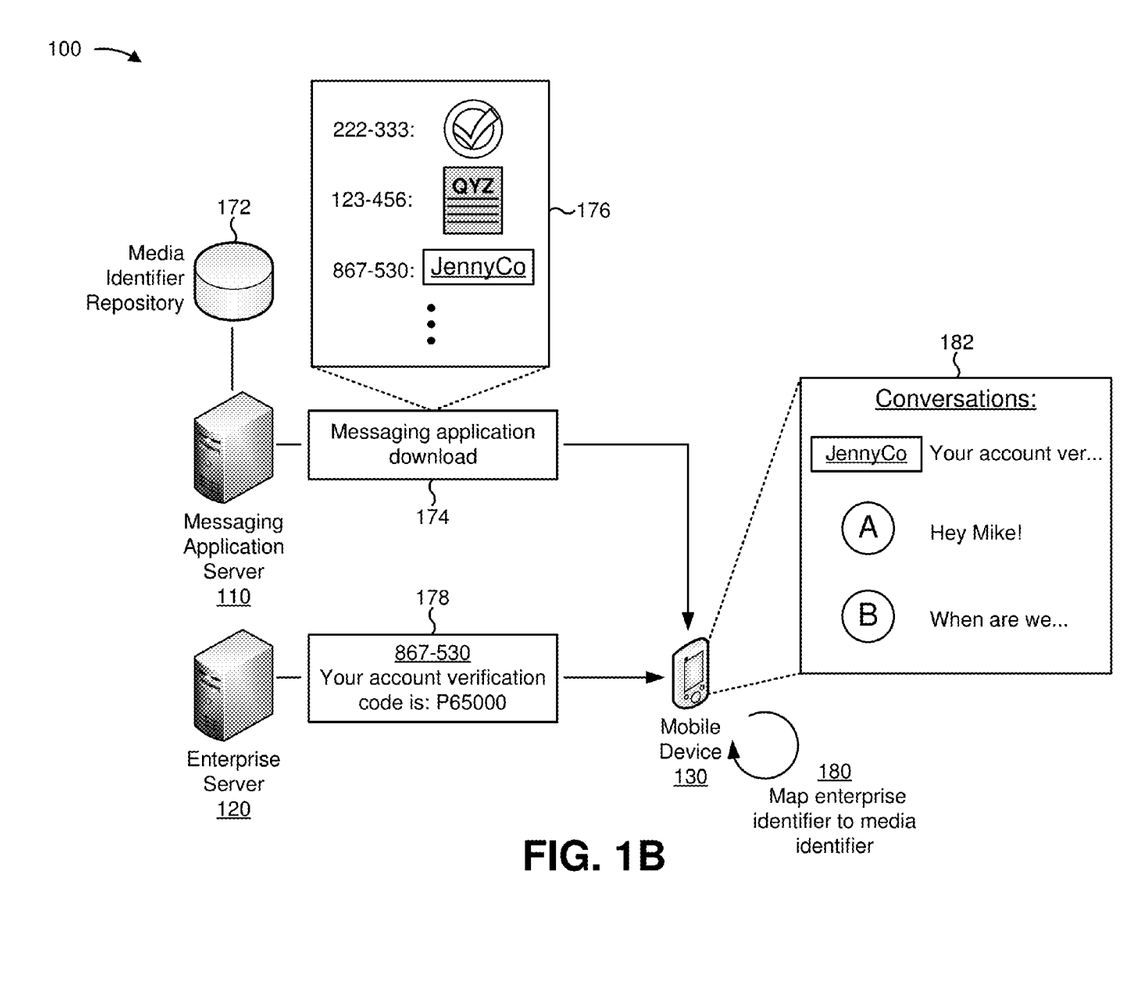

FIGS. 1A and 1B are diagrams of an overview of an example implementation 100 described herein. As shown in FIG. 1A, example implementation 100 may include messaging application server 110, enterprise server 120, and mobile device 130.

As further shown in FIG. 1A, and by reference number 152, messaging application server 110 may request verification information from enterprise server 120. For example, messaging application server 110 may request that enterprise server 120 provide information verifying that enterprise server 120 is genuine (e.g., is being operated by an enterprise client that is intended to be operating the enterprise server). As shown by reference number 154, enterprise server 120 may provide verification information and a media identifier that is to be associated with messages sent by enterprise server 120. For example, enterprise server 120 may provide information to messaging application server 110 confirming an operator of enterprise server 120 (e.g., a company "JennyCo") and providing a logo, a name, or the like for the operator of enterprise server 120. The media identifier for the operator of enterprise server 120 may be selected as having an increased likelihood of being recognized by a user of mobile device 130 relative to an enterprise identifier. For example, a recognized trademark of a company, an advertising slogan of a company, a sound associated with a company, or the like may be selected as the media identifier.

As further shown in FIG. 1A, and by reference number 156, messaging application server 110 may provide third party verified mapping information (e.g., mapping information verified for enterprise server 120 and mobile device 130 by application server 110) associated with mapping a set of enterprise identifiers (e.g., an identifier that is provided with a message sent by enterprise server 120, such as a short code, a long code, or the like) to a set of media identifiers. For example, mobile device 130 may provide an application programming interface (API) request for the mapping information, such as a periodic request, a request based on receiving a message, or the like. Mobile device 130 may store the mapping information (e.g., via a data structure).

As further shown in FIG. 1A, and by reference number 158, mobile device 130 may receive a message from enterprise server 120. For example, mobile device 130 may receive, from enterprise server 120, a particular message that includes an enterprise identifier (e.g. a numeric code, "867-530") and a message (e.g., an account verification code message for the user of mobile device 130). As shown by reference number 160, mobile device 130 may map the enterprise identifier to the media identifier. For example, mobile device 130 may utilize stored mapping information, and may determine that the enterprise identifier corresponds to the media identifier associated with enterprise server 120 (e.g., the logo for "JennyCo"). As shown by reference number 162, mobile device 130 may provide the media identifier with the message. For example, mobile device 130 may display the logo and the account verification code message via a user interface, thereby providing a visual indication that the account verification code message is genuine (e.g., is provided by the operator of enterprise server 120).

As shown in FIG. 1B, as another example, messaging application server 110 may include a media identifier repository 172, which may include mapping information associated with mapping a set of enterprise identifiers to a set of media identifiers. Messaging application server 110 may, periodically, receive one or more media identifiers (e.g., different media identifiers, updated media identifiers, or the like) for inclusion in media identifier repository 172. As shown by reference number 174, mobile device 130 may download a messaging application that includes mapping information 176 (e.g., the mapping information associated with mapping the set of enterprise identifiers to the set of media identifiers). For example, messaging application server 110 may provide mapping information 176 as a resource of the messaging application, rather than mobile device 130 periodically performing an API call to receive mapping information.

As further shown in FIG. 1B, and by reference number 178, mobile device 130 may receive a message from enterprise server 120 that is identified by an enterprise identifier. As shown by reference number 180, mobile device 130 may map the enterprise identifier to a corresponding media identifier included in mapping information 176. As shown by reference number 182, based on mapping the enterprise identifier to the corresponding media identifier, mobile device 130 may provide, for display, the media identifier with the message, thereby providing a visual indication of the sender of the message.

In this way, mobile device 130 may provide a media identifier that facilitates identification of a sender of an enterprise message. This permits mobile device 130 to reduce, relative to a message provided with a media identifier, a likelihood of a successful phishing attempt by reducing a likelihood that a user misidentifies a non-genuine enterprise message as being genuine. Moreover, mobile device 130 reduces a power consumption and/or a network usage associated with mobile device 130 based on providing information identifying the sender of the enterprise message rather than the user searching the Internet for the information identifying the sender of the enterprise message.

Figure 2:
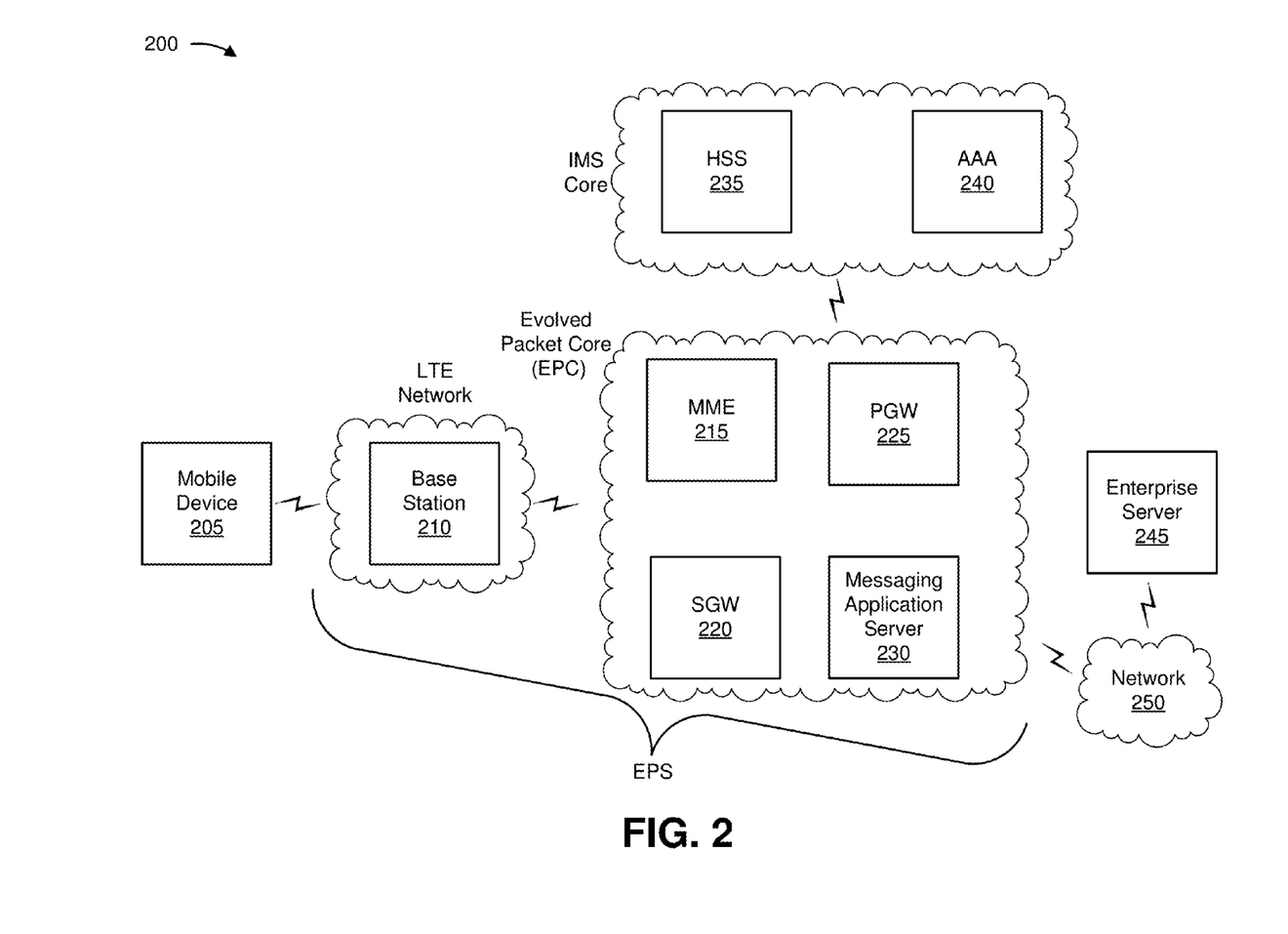
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a messaging application server 230; a home subscriber server (HSS) 235; an authentication, authorization, and accounting server (AAA) 240; an enterprise server 245 and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile device 205 communicates with the EPC. The EPC may include MME 215, SGW 220, PGW 225, and/or messaging application server 230 that enable mobile device 205 to communicate with network 250 and/or an Internet protocol (IP) multimedia subsystem (IMS) core. The IMS core may include HSS 235 and/or AAA 240, and may manage device registration and authentication, session initiation, etc., associated with mobile devices 205. HSS 235 and/or AAA 240 may reside in the EPC and/or the IMS core.

Mobile device 205 may include one or more devices capable of communicating with base station 210 and/or a network (e.g., network 250). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. In some implementations, mobile device 205 corresponds to mobile device 130 shown in FIGS. 1A and 1B. In some implementations, mobile device 205 may include information associated with mapping an enterprise identifier to a media identifier. In some implementations, mobile device 205 may operate a messaging application associated with receiving and/or providing enterprise messages (e.g., messages from and/or to one or more enterprise servers 245). Mobile device 205 may send traffic to and/or receive traffic from network 250 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to mobile device 205 via SGW 220 and base station 210. PGW 225 may record data usage information (e.g., byte usage), and may provide the data usage information to AAA 240.

Messaging application server 230 may include one or more devices capable of receiving, generating, storing, processing, and/or providing information associated with a message. For example, messaging application server 230 may include a server device associated with verifying an identity of enterprise server 245, receiving a media identifier associated with enterprise server 245 (e.g., an icon, an image, a video, a sound, or the like), and providing information associated with mapping a corresponding enterprise identifier to the media identifier. In some implementations, messaging application server 230 corresponds to messaging application server 110 shown in FIGS. 1A and 1B.

HSS 235 may include one or more devices, such as one or more server devices, capable of managing (e.g., receiving, generating, storing, processing, and/or providing) information associated with mobile device 205. For example, HSS 235 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 may include one or more devices, such as one or more server devices, that perform authentication, authorization, and/or accounting operations for communication sessions associated with mobile device 205. For example, AAA 240 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Enterprise server 245 may include one or more devices associated with receiving, generating, storing, processing, and/or providing information associated with an enterprise message (e.g., a message provided by enterprise server 245). For example, enterprise server 245 may provide an icon representing an organization associated with enterprise server 245 (e.g., a bank, a website, a store, etc.). Additionally, or alternatively, enterprise server 245 may generate an enterprise message, and may provide the enterprise message to mobile device 205 (e.g., via an enterprise messaging service of a wireless service provider being utilized by enterprise server 245 and/or mobile device 205). For example, enterprise server 245 may transmit the enterprise message (e.g., a bank confirmation code, a product offer, etc.) and the wireless service provider may route the message (e.g., via the EPC, the LTE network, etc.) to mobile device 205. Additionally, or alternatively, enterprise server 245 may receive a message from mobile device 205. In some implementations, enterprise server 245 corresponds to enterprise server 120 shown in FIGS. 1A and 1B.

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
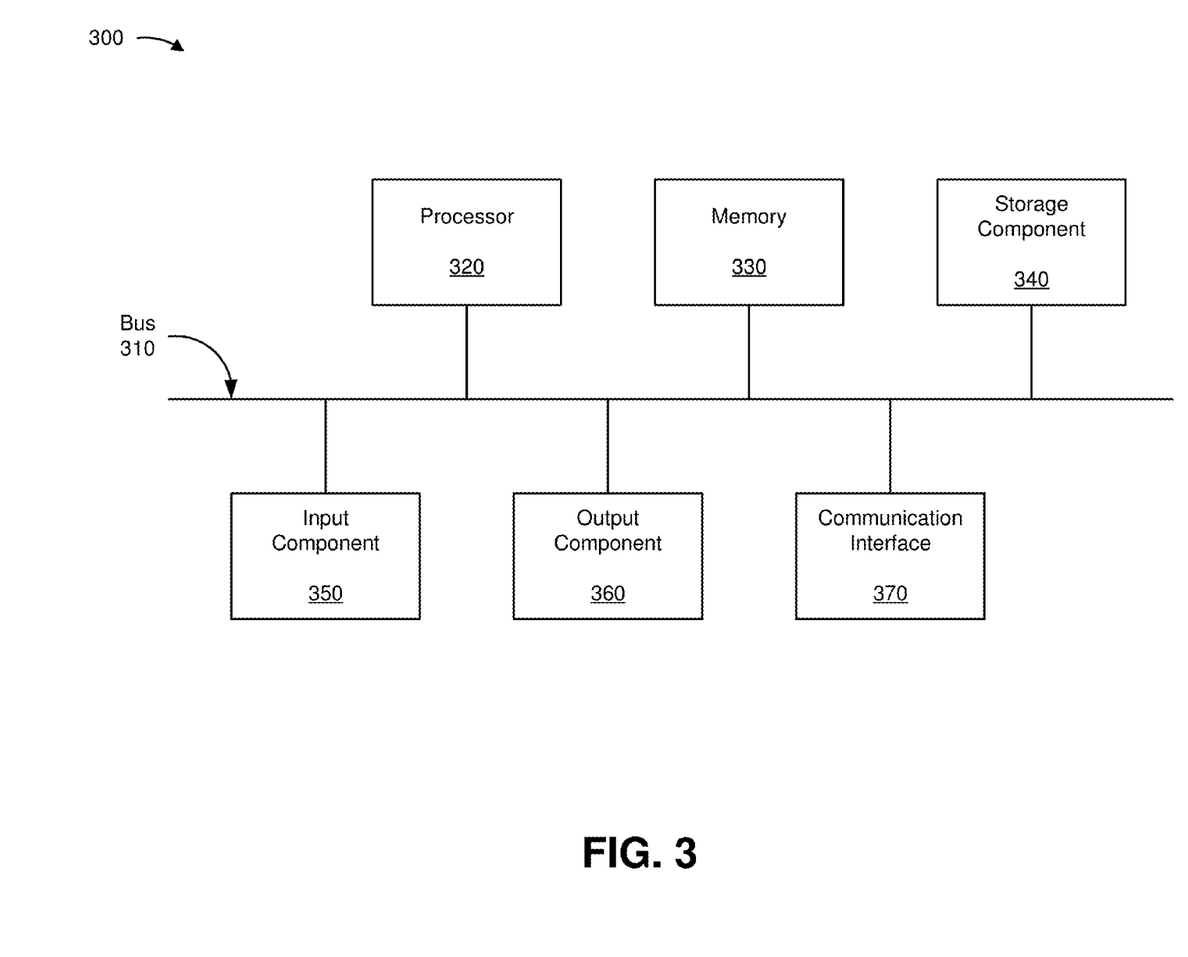
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, messaging application server 230, HSS 235, AAA 240, and/or enterprise server 245. In some implementations, mobile device 205, base station 210, MME 215, SGW 220, PGW 225, messaging application server 230, HSS 235, AAA 240, and/or enterprise server 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
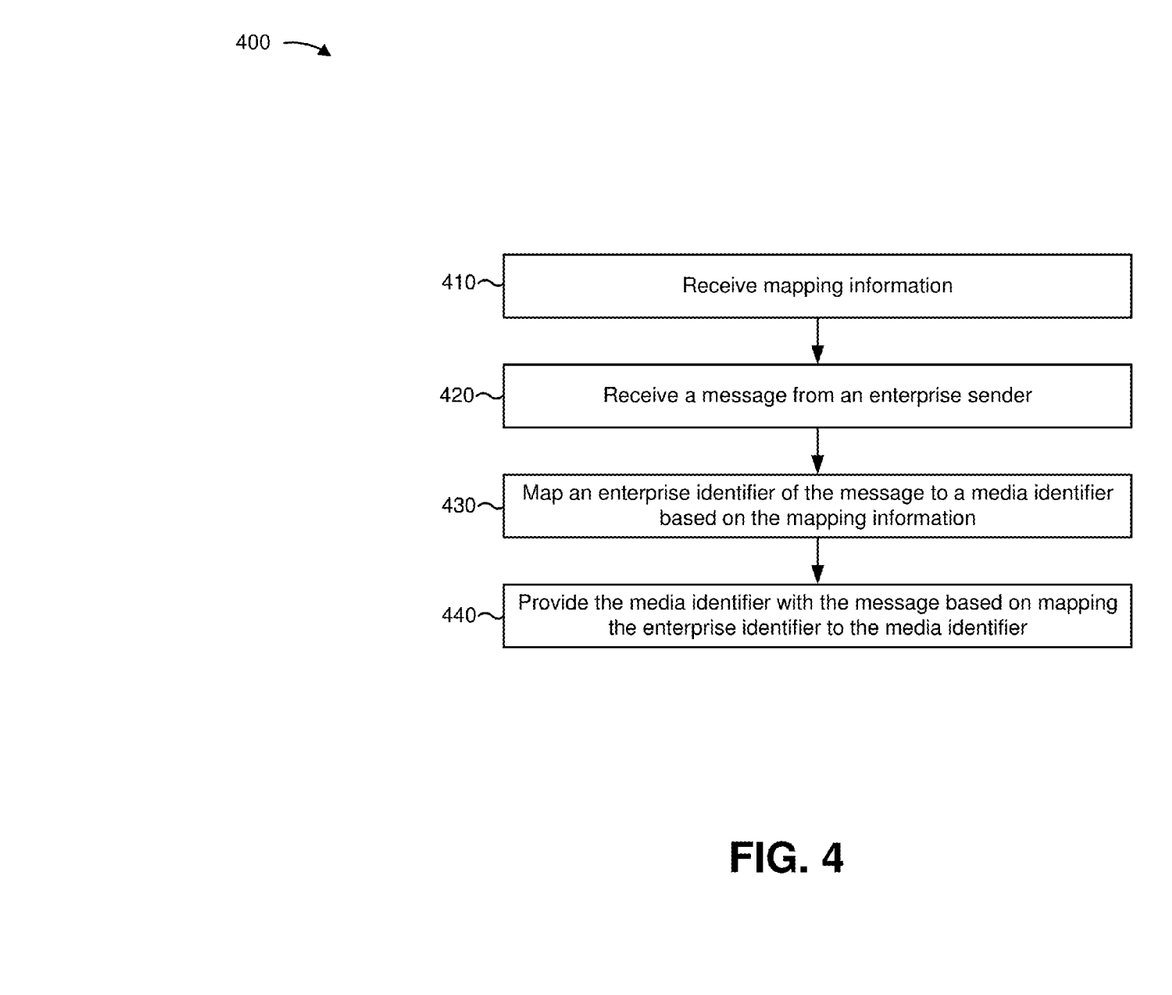
FIG. 4 is a flow chart of an example process for providing a media identifier to identify a sender of an enterprise message.

FIG. 4 is a flow chart of an example process 400 for providing a media identifier to identify a sender of an enterprise message. In some implementations, one or more process blocks of FIG. 4 may be performed by mobile device 205. In some implementations, one or more process blocks of FIG. 4 may be performed by another device or a group of devices separate from or including mobile device 205, such as messaging application server 110, enterprise server 120, mobile device 130, base station 210, MME 215, SGW 220, PGW 225, messaging application server 230, HSS 235, AAA 240, and/or enterprise server 245.

As shown in FIG. 4, process 400 may include receiving mapping information (block 410). For example, mobile device 205 may receive the mapping information associated with mapping a set of enterprise identifiers to a set of media identifiers. In some implementations, mobile device 205 may receive the mapping information based on receiving a messaging application. For example, when a messaging application (e.g., for receiving enterprise messages, non-enterprise messages, a combination of enterprise messages and non-enterprise messages, etc.) is downloaded to and/or installed on mobile device 205, the messaging application may include the mapping information, which is third party verified.

In some implementations, mobile device 205 may receive third-party verified mapping information. For example, when mobile device 205 (e.g., a first party) is associated with receiving an enterprise message with an enterprise identifier from enterprise server 245 (e.g., a second party), messaging application server 230 (e.g., a third party) may verify that the enterprise identifier corresponds to a media identifier intended to identify an operator of enterprise server 245. In this way, mobile device 205 may ensure that the mapping information can map an enterprise identifier to a media identifier based on verified information.

Additionally, or alternatively, mobile device 205 may receive the mapping information based on requesting the mapping information. For example, mobile device 205 may perform a first application programming interface (API) call to obtain first mapping information (as an API response) that includes an enterprise identifier, a media identifier, and an indicator of a threshold period of time (e.g., a time-to-live value indicating when the mapping information expires, such as a 7 day threshold, a 7 week threshold, a 1 year threshold, etc.). In this case, mobile device 205 may determine that the threshold period of time has elapsed, and may perform a second API call to obtain second mapping information (e.g., updated mapping information) from messaging application server 230 to replace the first mapping information. In some implementations, the mapping information may not expire.

In some implementations, mobile device 205 may receive a set of media identifiers when obtaining the mapping information. For example, mobile device 205 may determine that the mapping information includes information associated with identifying a media identifier that corresponds to an enterprise identifier and includes the media identifier (e.g., a text file, an image file, a sound file, or the like). In this case, mobile device 205 may store the set of media identifiers via a data structure (e.g., a local data structure, a remote data structure, or the like).

As further shown in FIG. 4, process 400 may include receiving a message from an enterprise sender (block 420). For example, mobile device 205 may receive the message from the enterprise sender utilizing enterprise server 245. In some implementations, mobile device 205 may receive the message via a short message service (SMS) message, a multimedia message service (MMS) message, or the like.

In some implementations, mobile device 205 may receive the message from enterprise server 245 based on requesting the message. For example, when a user of mobile device 205 requests multi-factor authentication of login information for a website of a bank, mobile device 205 may receive an authentication code via a message from enterprise server 245 (which is associated with the bank). In this case, the user may desire to verify that the message was provided by enterprise server 245, rather than by another server associated with a malicious purpose (e.g., operated by a sender performing a phishing attempt).

In some implementations, mobile device 205 may determine that an identifier associated with the message is an enterprise identifier. For example, mobile device 205 may parse the message and/or information associated with the message to identify a short code, a long code, or the like that is associated with identifying an enterprise sender (e.g., enterprise server 245). In this case, mobile device 205 may determine that the short code, long code, or the like is associated with identifying the enterprise sender based on the mapping information including the short code, the long code, or the like in a set of enterprise identifiers. In some implementations, mobile device 205 may determine that the message is an enterprise message based on determining that the identifier is an enterprise identifier.

In some implementations, mobile device 205 may verify the enterprise identifier as being genuine. For example, mobile device 205 may determine that a short code, assigned by an operator of messaging application server 230 to enterprise server 245 is intended to be associated with enterprise server 245. In this way, mobile device 205 reduces a likelihood of a malicious user falsifying the enterprise identifier relative to failing to perform a verification on the short code of the enterprise identifier.

As further shown in FIG. 4, process 400 may include mapping an enterprise identifier of the message to a media identifier based on the mapping information (block 430). For example, mobile device 205 may map the enterprise identifier of the message to the media identifier based on the mapping information. In some implementations, mobile device 205 may obtain the mapping information from a data structure for utilization in mapping the enterprise identifier to the media identifier. For example, when the mapping information is stored via a data structure (e.g., as a resource for a messaging application, as storage after an API call, or the like), mobile device 205 may obtain the mapping information to map the message to the media identifier.

Additionally, or alternatively, mobile device 205 may request the mapping information based on receiving the enterprise identifier, such as by requesting mapping information for a set of enterprise identifiers (e.g., that includes the enterprise identifier), requesting mapping information for the enterprise identifier, or the like, as described herein with regard to block 410.

In some implementations, mobile device 205 may determine that the enterprise identifier corresponds to the media identifier when mapping the enterprise identifier to the media identifier. For example, mobile device 205 may determine that the mapping information indicates that the enterprise identifier is associated with the media identifier.

As further shown in FIG. 4, process 400 may include providing the media identifier with the message based on mapping the enterprise identifier to the media identifier (block 440). For example, mobile device 205 may provide, for display via a user interface, the media identifier with the message based on mapping the enterprise identifier to the media identifier. In some implementations, mobile device 205 may obtain the media identifier that is to be provided with the message. For example, based on determining that the media identifier is associated with the enterprise identifier, mobile device 205 may obtain the media identifier (e.g., a logo, a name, a name and a logo, etc.) from a data structure, from messaging application server 230, or the like.

In some implementations, mobile device 205 may provide the media identifier via a user interface. For example, mobile device 205 may provide a logo associated with an operator of enterprise server 245 and a name associated with the operator of enterprise server 245 via a user interface of a messaging application to identify the operator of enterprise server 245. In some implementations, mobile device 205 may provide the media identifier without providing the enterprise identifier. In some implementations, mobile device 205 may consolidate multiple messages into a single thread of messages that is identified by the media identifier when providing the media identifier for display. For example, mobile device 205 may determine that the message is provided by the same sender as one or more other messages, and mobile device 205 may generate a thread of multiple messages that includes the message and the one or more messages, all of which are identified by the media identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, mobile device 205 reduces a difficulty in determining an identity of a sender of a message (e.g., an enterprise message) by providing a media identifier relative to providing an enterprise identifier without a media identifier. Moreover, mobile device 205 may reduce network utilization and/or battery utilization based on reducing a likelihood, relative to providing the enterprise identifier, that the user utilize a search engine via mobile device 205 to identify the sender of the message.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive mapping information associated with mapping a set of enterprise identifiers to a set of media identifiers,
the mapping information representing a third party verification, for the device, that each enterprise identifier, of the set of enterprise identifiers, corresponds to a respective media identifier of the set of media identifiers;
receive an enterprise message from a sender identified by an enterprise identifier of the set of enterprise identifiers;
map the enterprise identifier to a respective media identifier, of the set of media identifiers, based on the mapping information;
provide the media identifier with the enterprise message via a user interface based on mapping the enterprise identifier to the media identifier;
determine that a threshold period of time associated with the mapping information has elapsed;
request updated mapping information based on determining that the threshold period of time has elapsed, the updated mapping information being associated with mapping another enterprise identifier with another media identifier;
receive the updated mapping information based on requesting the updated mapping information;
receive another enterprise message from another sender identified by the other enterprise identifier;
map the other enterprise identifier to the other media identifier based on the updated mapping information; and
provide the other media identifier with the other enterprise message based on mapping the other enterprise identifier to the other media identifier.

2. The device of claim 1, where the media identifier includes at least one of:
an icon,
a logo,
an image,
a name,
a video, or a sound.

3. The device of claim 1, where the enterprise message is a short message service (SMS) message.

4. The device of claim 1, where the enterprise identifier is:
a short code, or
a long code.

5. The device of claim 1, where the one or more processors, when providing the media identifier, are to:
provide the media identifier via the user interface without providing the enterprise identifier via the user interface.

6. The device of claim 1, where the one or more processors, when providing the media identifier, are to:
provide a logo associated with the sender and a name associated with the sender,
the logo and the name being verified by a third party as each being associated with identifying the sender.

7. The device of claim 1, where the other media identifier is different from the set of media identifiers.

8. The device of claim 1, where, when receiving the mapping information, the one or more processors are to:
download or install a messaging application that includes the mapping information.

9. The device of claim 1, where the other media identifier is an updated media identifier of one media identifier of the set of media identifiers.

10. A computer-readable medium storing instructions, the instructions comprising:
one or more instructions that, when executed by one or more processors, cause the one or more processors to:
receive mapping information associated with mapping a set of enterprise identifiers to a set of media identifiers,
the mapping information including information indicating that an enterprise identifier, of the set of enterprise identifiers, corresponds to a media identifier of the set of media identifiers,
the mapping information being verified by a third party, and
the media identifier being associated with identifying a sender that utilizes the enterprise identifier to send enterprise messages;
receive an enterprise message, of the enterprise messages, from the sender identified by the enterprise identifier;
map the enterprise identifier to the media identifier based on the mapping information;
provide the media identifier with the enterprise message via a user interface based on mapping the enterprise identifier to the media identifier;
determine that a threshold period of time associated with the mapping information has elapsed;
request updated mapping information based on determining that the threshold period of time has elapsed, the updated mapping information being associated with mapping another enterprise identifier with another media identifier;
receive the updated mapping information based on requesting the updated mapping information;
receive another enterprise message from another sender identified by the other enterprise identifier;
map the other enterprise identifier to the other media identifier based on the updated mapping information; and
provide the other media identifier with the other enterprise message based on mapping the other enterprise identifier to the other media identifier.

11. The computer-readable medium of claim 10, where the media identifier includes at least one of:
an icon,
a logo, an image,
a name,
a video, or
a sound.

12. The computer-readable medium of claim 10, where the enterprise message is a multimedia message service message.

13. The computer-readable medium of claim 9, where the one or more instructions, that cause the one or more processors to provide the media identifier, cause the one or more processors to:
    provide a logo associated with the sender and a name associated with the sender,
        the logo and the name being verified by the third party as each being associated with identifying the sender.

14. The computer-readable medium of claim 10, where the one or more instructions, that cause the one or more processors to receive the mapping information, cause the one or more processors to:
    download a messaging application that includes the mapping information.

15. A method, comprising:
    receiving, by a device of a first party, mapping information,
        the mapping information being associated with a third party verification by a third party, and
        the mapping information being associated with mapping an enterprise identifier, of a second party, to a media identifier selected by the second party or the third party to represent the second party;
    mapping, by the device, the enterprise identifier to the media identifier based on the mapping information;
    providing, by the device, the media identifier with a message for display;
    determining, by the device, that a threshold period of time associated with the mapping information has elapsed;
    requesting, by the device, updated mapping information based on determining that the threshold period of time has elapsed,
        the updated mapping information being associated with mapping another enterprise identifier with another media identifier;
    receiving, by the device, the updated mapping information based on requesting the updated mapping information;
    mapping, by the device, the other enterprise identifier to the other media identifier based on the updated mapping information; and
    providing, by the device, the other media identifier with another enterprise message for display based on mapping the other enterprise identifier to the other media identifier.

16. The method of claim 15, where the first party, the second party, and the third party are different parties.

17. The method of claim 15, where the enterprise identifier is a short code assigned to the second party by the third party.

18. The method of claim 15, where the media identifier is a logo associated with the second party or a name associated with the second party.

19. The method of claim 15, where the message is:
    a short message service message, or
    a multimedia message service message.

20. The method of claim 15, where receiving the mapping information comprises:
    installing a messaging application that includes the mapping information.

\* \* \* \* \*